United States Patent
Tisch et al.

(10) Patent No.: US 7,895,702 B2
(45) Date of Patent: Mar. 1, 2011

(54) WINDSHIELD WIPER SYSTEM WITH A SELF-LOCKING DEVICE THAT IS ACTIVE WHEN THE WIPER DRIVE IS IN A NON-OPERATING STATE

(75) Inventors: Florian Tisch, Renchen-Ulm (DE); Hubertus Karcher, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 484 days.

(21) Appl. No.: 11/915,017

(22) PCT Filed: Sep. 25, 2006

(86) PCT No.: PCT/EP2006/066692
§ 371 (c)(1),
(2), (4) Date: Nov. 20, 2007

(87) PCT Pub. No.: WO2007/048668
PCT Pub. Date: May 3, 2007

(65) Prior Publication Data
US 2008/0196190 A1    Aug. 21, 2008

(30) Foreign Application Priority Data
Oct. 24, 2005   (DE) .................... 10 2005 050 774

(51) Int. Cl.
   *B60S 1/08* (2006.01)
(52) U.S. Cl. ............... 15/250.17; 15/250.3; 318/DIG. 2
(58) Field of Classification Search ............ 15/250.17, 15/250.3, 250.12, 250.16, 250.13; 318/DIG. 2, 318/443, 444
See application file for complete search history.

(56) References Cited

U.S. PATENT DOCUMENTS

| 5,539,269 | A | 7/1996 | Altmann et al. |
| 6,219,598 | B1 | 4/2001 | Miwa et al. |
| 6,944,906 | B2* | 9/2005 | Moein et al. ............. 15/250.3 |
| 2004/0216257 | A1 | 11/2004 | Weigold et al. |

FOREIGN PATENT DOCUMENTS

| DE | 4417371 A1 | 11/1995 |
| DE | 10312982 A1 | 10/2004 |
| EP | 1375271 A2 | 1/2004 |
| FR | 2852904 | 10/2004 |
| JP | 3044063 U | 4/1991 |

OTHER PUBLICATIONS

PCT/EP2006/066692 International Search Report.

* cited by examiner

*Primary Examiner*—Gary K Graham
(74) *Attorney, Agent, or Firm*—Michael Best & Friedrich LLP

(57) ABSTRACT

In order to ensure, when the drive (1) is in a non-operating state, a self-locking that counters a change in position of the wiper (5), an electronically implemented self-locking is provided. To this end, the controller (S) of the wiper system monitors the wiper (5) during the non-operating state of the drive (1) by evaluating the position sensor signals for a change in position and, in response to the position monitoring, activates the drive (1) in order to return the wiper (5) into a set position (U, P).

11 Claims, 2 Drawing Sheets

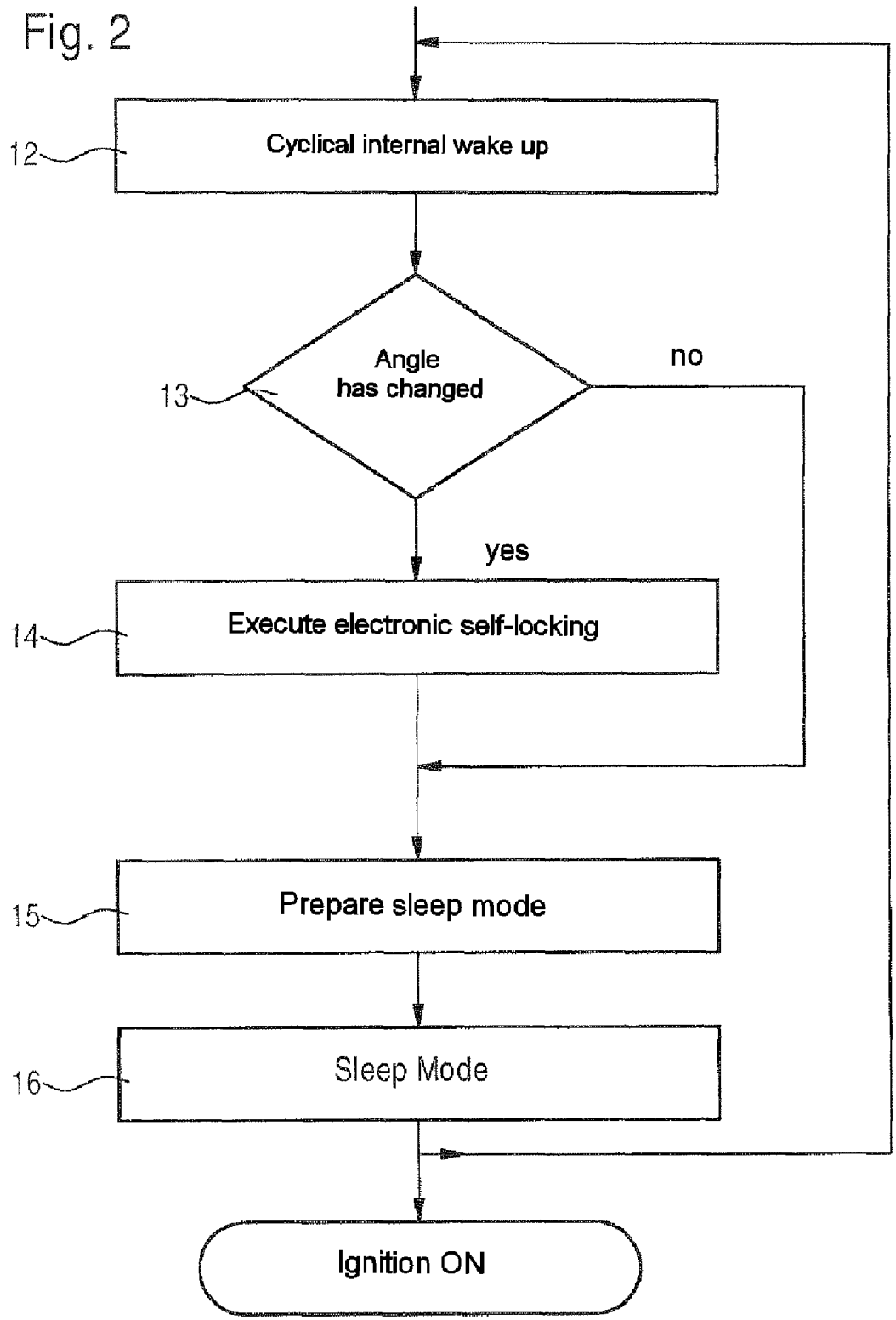

WINDSHIELD WIPER SYSTEM WITH A SELF-LOCKING DEVICE THAT IS ACTIVE WHEN THE WIPER DRIVE IS IN A NON-OPERATING STATE

BACKGROUND OF THE INVENTION

The invention relates to a windshield wiper system for a motor vehicle, comprising at least one wiper, a drive, a self-locking device that is active when the drive is in a non-operating state and counteracts a change in position of the wiper, and comprising an electronic control means which actuates the drive and detects the input of position sensor signals of the wiper.

A wiper system of this type comprising means for locking the wiper drive in the non-operating state is already known from DE 103 12 982 A1.

Windshield wiper drive apparatuses in which a rotary movement of a motor which rotates in a prespecified direction is converted into a to-and-fro movement of the windshield wiper by an eccentric mechanism, in particular a crank gear, have long been known. The output shafts of such drives are therefore connected indirectly, via a crank and a thrust linkage, to the wiper shafts to which wiper arms with wiper blades are fixed. The non-uniform transmission ratio of the crank gear, which is minimal in the covered or extended position, produces in these positions, in contrast, a maximum transmission ratio, that is to say one which requires considerable torque, with regard to a rotary movement which originates from the wiper arm and is transmitted to the output shaft. Since the wiper arms in standard wiper drives of this type are arranged in the park or inoperative position in the extended position of the wiper linkage, mechanical self-locking, which is realized by means of the wiper linkage, with regard to a reversed transmission of movement from the wiper arm to the motor is produced on account of these very high transmission ratios within the scope of the customary, indirect transmission of movement without further measures.

When the drive is in the non-operating state, the self-locking device counteracts a change in position of the wiper in the event of a torque which acts on a wiper, which is in the inoperative position, due to external influences. This is desirable since the armature shaft of the wiper motor is not supplied with power in the non-operating state and therefore would rotate freely without adequate self-locking, this producing the risk of the wiper being moved into the wiping area, for example by the head wind.

In more modern wiper systems, drives with reversing electric motors are increasingly being used, in which the motor is controlled in different directions of rotation in accordance with the to-and-fro movement of the wiper. In this case, it is necessary to provide an electronic control means which detects the input of position sensor signals when the wiper is switched on, in order to be able to change over the direction of rotation of the motor at the correct time. Reversing motors of this type permit a more flexible mechanical construction of the wiper system and an enhanced functionality, for example an extended park position. In this case, the wiper is not stored in the lower reverse position, but deeper, that is to say outside the field of view. One problem with this is the slight deviation of the wiper linkage from the extended position, which deviation is associated with the new inoperative position and can lead to excessively weak self-locking of the drive.

A highly desired variant of the reversing drive, the so-called direct wiper drive, is particularly problematical in terms of self-locking. In this case, the output shaft of the worm gear of the drive is connected to a wiper arm directly or via a gear mechanism with a uniform transmission ratio. Since the omission of the crank gear also results in the loss of the self-locking produced by the crank gear, DE 103 12 982 A1 of this generic type proposes providing an additional energy storage means, in particular a helical spring, in the drive in order to produce self-locking in this way.

However, unconventional mechanical self-locking measures such as helical springs or blocking elements are relatively complicated and have to be matched to the respective design of the wiper system. However, complete omission of self-locking measures is not possible either since otherwise, as already explained above, the wiper arm or the wiper arms could move from the park position into the wiping area as a result of misuse or other external influences (for example a car wash).

SUMMARY OF THE INVENTION

The invention provides electronically implemented self-locking, so that it is possible to dispense with mechanical self-locking measures in wiper drives. The invention is further based on the idea that the requirement for self-locking, specifically for counteracting rotation of the wiper into the field of view, which rotation impairs the field of view of the driver, can be met as early as when the wiper is returned after rotation and so soon that there is virtually no disruption in the viewing conditions. According to the invention, the control means monitors the wiper for a change in position when the drive is in the non-operating state by evaluating the position sensor signals. When the position-monitoring means responds, the control means actuates the drive in order to return the wiper to a setpoint position. The self-locking according to the invention can be used in all wiper systems with electronic wiper-motor actuation.

A particularly advantageous development is considered to be one which permits electronic self-locking, which is naturally assigned to a power supply, but in this case the vehicle battery should be preserved as far as possible, even when the ignition is switched off, for example in a car wash. To this end, the control means is designed as an internally wakeable electronics system which is connected to the vehicle battery when the ignition of the motor vehicle is switched off and is in a standby state when the electronic self-locking device is not active, with the control means cyclically waking itself in the standby state, in each case assuming an operating state with active electronic self-locking for a wake phase, and returning to the standby state. In this way, a change in position of the wiper which occurs beforehand or occurs during the continuous wake phase is counteracted.

In order to preserve the vehicle battery together with simultaneous frequency of monitoring which has been found sufficient in practice, it is advantageous in this case for the control means to wake itself cyclically at time intervals of the order of magnitude of one second. If the position-monitoring means does not respond, the wake phase can last only approximately 10 ms. In this case, it is also advantageous for the response of the position-monitoring means to lead to the wiper being returned to the setpoint position only when a prespecifiable threshold value for the change in position is exceeded. This threshold value for the change in position is advantageously approximately 3% of the maximum wiping angle.

Since electronic self-locking does not require a crank gear, it can also ensure adequate self-locking in direct wiper drives, that is to say in cases in which the drive has at least one reversing motor with an output shaft, with the output shaft being connected to a wiper arm of the wiper directly or via a gear mechanism with a uniform transmission ratio.

BRIEF DESCRIPTION OF THE DRAWINGS

An exemplary embodiment of the invention is described in greater detail in the following description and illustrated in the figures, in which FIG. 2 shows a flowchart for explaining the self-locking algorithm of the wiper system when the ignition of the motor vehicle is switched off.

DETAILED DESCRIPTION

Figure 1:
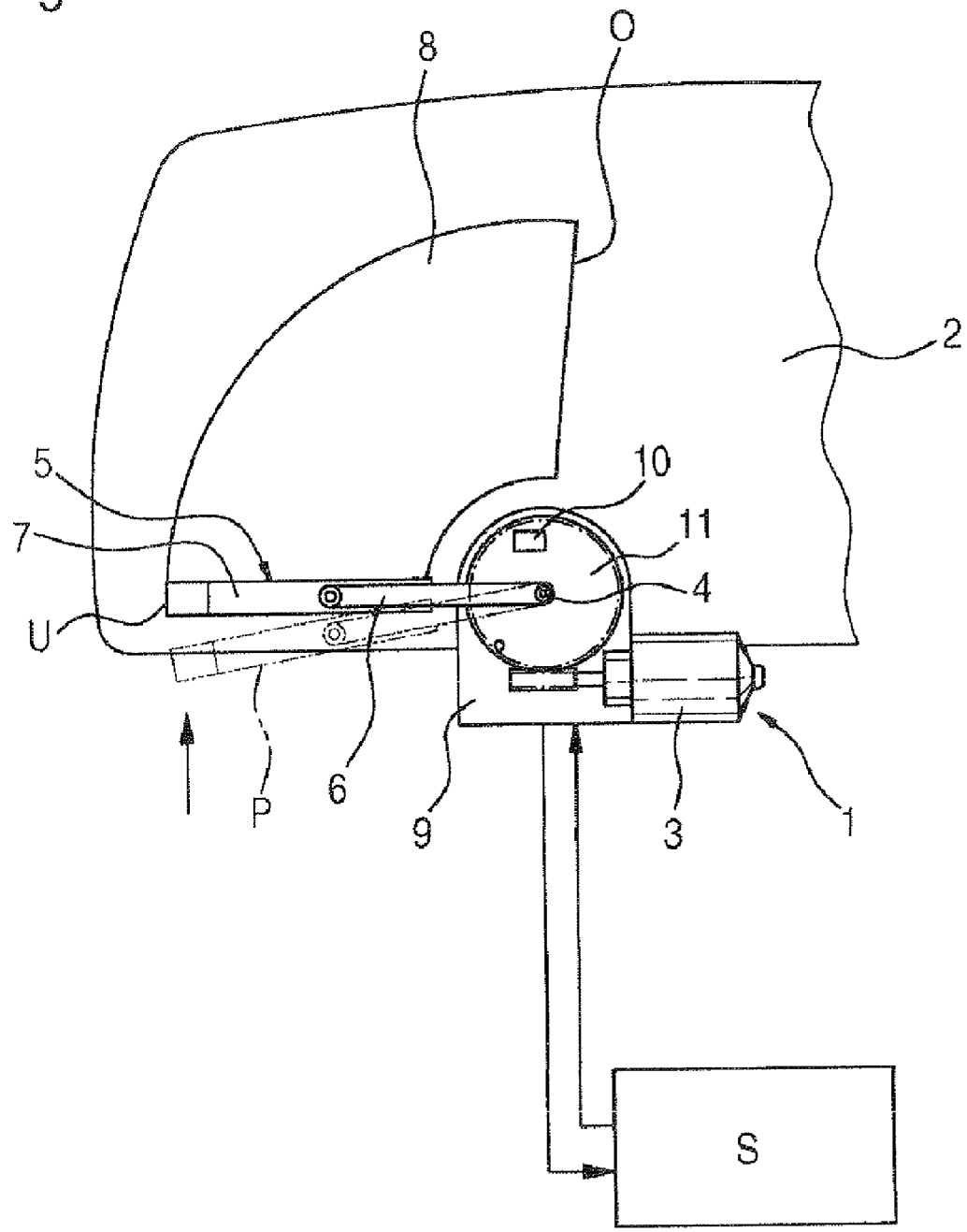
FIG. 1 shows a wiper system according to the invention with a self-locking algorithm which is implemented in the control means.

FIG. 1 shows a schematic illustration of a windshield wiper apparatus according to the invention on a windshield 2 of a motor vehicle. For reasons of clarity, only half of the windshield 2 is shown here. The wiper system comprises a drive 1 with a reversing motor 3 which drives an output shaft 4 to which a wiper 5 is connected in a rotationally fixed manner. The wiper 5 substantially comprises a wiper arm 6 which has a wiper blade 7 connected to its free end in an articulated manner. During operation, the output shaft 4 executes an oscillating movement, so that the wiper 5 moves across the windshield 2 in an oscillating manner. In this case, the region of the windshield 2 which is covered by the wiper blade 7 forms the wiping area 8.

When the reversing motor 3 is supplied with power, the wiper 5 oscillates between the lower reversal position U and an upper reversal position O. An extended park position P, in which the wiper is in the non-operating state, is also indicated in FIG. 1.

When the vehicle is moving, the head wind acts on the wiper 5 and pushes it—on account of the inclination of the windshield 2—upward. This flow of air is indicated by a flow arrow. As a result, a torque acts on the output shaft 4. If the reversing motor 3 is not supplied with power, the wiper 5 moves upward into the wiping area 8 since, without mechanical self-locking, a torque which prevents rotation from the start does not counteract the torque generated by the head wind or another external influence. This effect is undesirable since the wiper 5 moves into the field of view of the driver as a result.

The electronic control means S of the wiper system can be arranged, for example, on the inside of the housing cover 9 of the drive 1. A position sensor 10 can be arranged, for example, on the worm gear 11 in order to detect the position of the worm gear 11 and therefore of the wiper 5.

The preconditions required for carrying out the self-locking algorithm substantially match the preconditions required for electronic actuation of the reversing motor 3. A microcontroller-controlled electronics system can advantageously be used to detect signal inputs, for example LIN bus (Local Interconnect Network), to detect the position sensor signals and to actuate a power output stage (for example H-bridge circuit).

As a further precondition for effective electronic self-locking, the wiper motor and the electronics system have to be continuously supplied with voltage. To this end, an internally wakeable electronics system (controller in the standby mode) is used to reduce the power consumption in the non-operating state of the system, that is to say when the ignition is switched off. In this case, part of the electronics control system S, the wake-up circuit, is supplied with voltage from the vehicle battery in a manner which is known per se in the standby mode too, whereas the parts which consume more energy, such as the monitoring means for the position sensor signal and the actuation circuit, are moved to a sleep state.

The flowchart which is illustrated in FIG. 2 begins with the ignition of the motor vehicle switched off, and on account of this the electronic control means S has moved to an energy-saving sleep mode in which essential parts of the control means S, in particular of the microcontroller, are switched off or moved to a reduced operating state. In accordance with the subsequent program step 12, the control means S moves to the full operating state by being cyclically internally woken up for the duration of a wake phase by means of the wake-up circuit. The time intervals between the wake phases can be, for example, approximately one second.

In accordance with the subsequent program step 13, the control means S checks whether there is a change in position, that is to say a change in the wiping angle of the wiper 5 with respect to the setpoint position, in this wake phase which lasts for 10 ms for example. This change may have already occurred before the start of the wake phase or occur during the wake phase. Depending on the result of the position check 13, the program sequence of the electronic self-locking algorithm may branch off.

If a change in position is established, the wiper is returned to the setpoint position by a position control means which is implemented in the microcontroller. This step 14 is electronic self-locking in the narrower sense. Execution of this step 14 can be readily modified by introducing a threshold value, that is to say by prespecifying a minimum change in position. This threshold value for the change in position can be approximately 3% of the maximum wiping angle. After the wiper 5 is returned to the setpoint position, the control means S prepares to return to the sleep mode in the next program step 15. In the following program step 16, the control means S assumes the sleep mode, with the program sequence being cyclically repeated in accordance with the described algorithm until the program sequence is ended by the ignition being switched on. When the ignition is switched on, the wiper 5 is continuously monitored and self-locked since enough energy is available, in contrast to the algorithm according to FIG. 2.

If no change in position is established in program step 13, there is no return operation in accordance with step 14, but rather the changeover to the sleep mode in accordance with program steps 15 and 16 at the end of the normal wake phase.

The invention claimed is:

1. A windshield wiper system for a motor vehicle, comprising at least one wiper (5), a drive (1), an electronic self-locking device that is active when the drive (1) is in a non-operating state and counteracts a change in position of the wiper (5), and comprising an electronic control means (S) which actuates the drive (1) and detects the input of position sensor signals of the wiper (5), characterized in that electronically implemented self-locking is provided, with the control means (S) in combination with the position sensors defining a position monitoring means monitoring the wiper (5) for a change in position when the drive (1) is in the non-operating state by evaluating the position sensor signals, and actuating the drive (1) when the position-monitoring means responds, in order to return the wiper (5) to a setpoint position (U, P.).

2. The windshield wiper system as claimed in claim 1, characterized in that the control means (S) is designed as an internally wakeable electronics system which is connected to a vehicle battery when an ignition of the motor vehicle is switched off and is in a standby state when the electronic self-locking device is not active, with the control means (S) cyclically waking itself in the standby state, in each case assuming an operating state with active electronic self-locking for a wake phase, and returning to the standby state.

3. The windshield wiper system as claimed in claim 2, characterized in that the control means (S) wakes itself cyclically at time intervals of the order of magnitude of one second.

4. The windshield wiper system as claimed in claim 3, characterized in that the wake phase lasts approximately 10 ms when the position-monitoring means does not respond.

5. The windshield wiper system as claimed in claim 2, characterized in that the wake phase lasts approximately 10 ms when the position-monitoring means does not respond.

6. The windshield wiper system as claimed in claim 5, characterized in that response of the position-monitoring means leads to the wiper (5) being returned to the setpoint position only when a prespecifiable threshold value for the change in position is exceeded.

7. The windshield wiper system as claimed in claim 6, characterized in that the threshold value for the change in position is approximately 3% of a maximum wiping angle.

8. The windshield wiper system as claimed in claim 7, characterized in that the drive (1) has at least one reversing motor (3) with an output shaft (4), and in that the output shaft (4) is connected to a wiper arm (6) of the wiper (5) directly or via a gear mechanism with a uniform transmission ratio.

9. The windshield wiper system as claimed in claim 1, characterized in that response of the position-monitoring means leads to the wiper (5) being returned to the setpoint position only when a prespecifiable threshold value for the change in position is exceeded.

10. The windshield wiper system as claimed in claim 9, characterized in that the threshold value for the change in position is approximately 3% of a maximum wiping angle.

11. The windshield wiper system as claimed in claim 1, characterized in that the drive (1) has at least one reversing motor (3) with an output shaft (4), and in that the output shaft (4) is connected to a wiper arm (6) of the wiper (5) directly or via a gear mechanism with a uniform transmission ratio.

* * * * *